(12) United States Patent
Heiligenmann et al.

(10) Patent No.: US 8,496,759 B2
(45) Date of Patent: Jul. 30, 2013

(54) DISHWASHER WITH A WATER PREPARATION SYSTEM

(75) Inventors: Caroline Heiligenmann, Thannhausen (DE); Helmut Jerg, Giengen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 814 days.

(21) Appl. No.: 10/572,146

(22) PCT Filed: Nov. 16, 2004

(86) PCT No.: PCT/EP2004/052975
§ 371 (c)(1),
(2), (4) Date: Mar. 14, 2006

(87) PCT Pub. No.: WO2005/051157
PCT Pub. Date: Jun. 9, 2005

(65) Prior Publication Data
US 2007/0022789 A1 Feb. 1, 2007

(30) Foreign Application Priority Data
Nov. 26, 2003 (DE) .................................. 103 55 139

(51) Int. Cl.
*B08B 7/00* (2006.01)
*B08B 9/20* (2006.01)
*B08B 3/00* (2006.01)

(52) U.S. Cl.
USPC ......... 134/10; 134/25.1; 134/25.2; 134/56 D; 134/109; 134/111; 134/184

(58) Field of Classification Search ................. 134/22.19
See application file for complete search history.

(56) References Cited

U.S. PATENT DOCUMENTS

| | | | |
|---|---|---|---|
| 4,244,815 A * | 1/1981 | Chaikin et al. | 210/622 |
| 5,599,452 A * | 2/1997 | MacLaren et al. | 210/615 |
| 5,871,647 A * | 2/1999 | Lord | 210/615 |
| 6,074,491 A * | 6/2000 | McClure et al. | 134/10 |

(Continued)

FOREIGN PATENT DOCUMENTS

| | | |
|---|---|---|
| CN | 1286646 | 3/2001 |
| DE | 2420302 | * 11/1975 |

(Continued)

OTHER PUBLICATIONS

International Search Report PCT/EP2004/052975.

*Primary Examiner* — Nicole Blan
(74) *Attorney, Agent, or Firm* — James E. Howard; Andre Pallapies

(57) ABSTRACT

A dishwasher is provided that advantageously enables reduction of the amount of water required during the rinsing cycle in order to thereby minimize operational costs and to improve environmental compatibility. A water preparation system has a water preparation container which can receive at least one part of the rinsing liquid used during operation of the dishwasher. The impurities contained in the rinsing liquid are at least partially biodegraded during a water preparation phase with the aid of microorganisms. By preparing and recycling at least one part of the used rinsing water, it is possible to reduce the requirement for fresh water. This enables the burden on the environment to be reduced since at least one part of the water used during the rinsing process is biologically cleansed while it is still in the dishwasher and the requirement for fresh water for the dishwasher is thus reduced.

20 Claims, 2 Drawing Sheets

U.S. PATENT DOCUMENTS

| | | | |
|---|---|---|---|
| 6,103,017 A * | 8/2000 | Thies et al. | 134/10 |
| 6,156,192 A * | 12/2000 | Rummler | 210/153 |
| 6,605,157 B2 * | 8/2003 | Hegeman | 134/10 |
| 7,303,908 B1 * | 12/2007 | Overland et al. | 435/289.1 |
| 2003/0094412 A1 | 5/2003 | Jungbauer | |
| 2004/0173249 A1 * | 9/2004 | Assmann et al. | 134/94.1 |
| 2007/0095371 A1 * | 5/2007 | Berens | 134/108 |

FOREIGN PATENT DOCUMENTS

| | | | |
|---|---|---|---|
| DE | 40 04 057 | | 8/1991 |
| JP | 8-8206392 | | 8/1996 |
| WO | WO 95/27682 | | 10/1995 |
| WO | WO 98/32703 | | 7/1998 |
| WO | WO0212427 | * | 2/2002 |

* cited by examiner

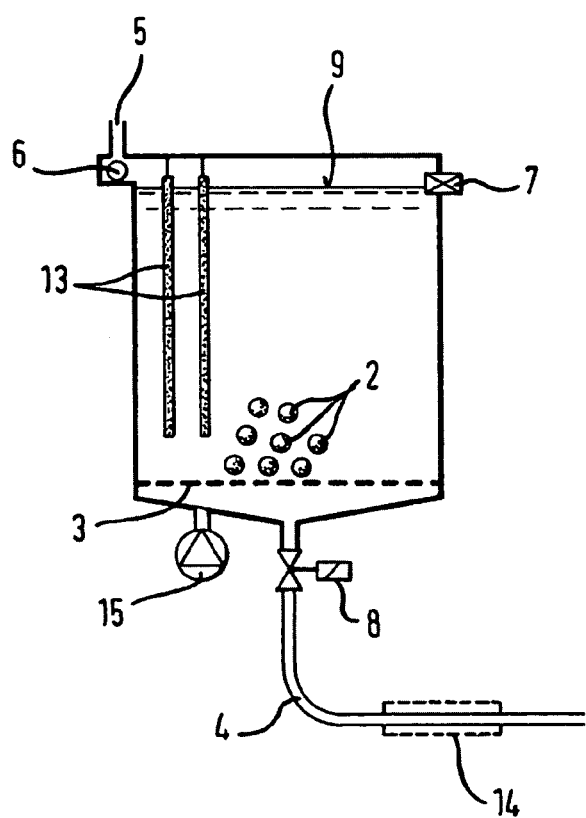

DISHWASHER WITH A WATER PREPARATION SYSTEM

The invention relates to a dishwasher with a water preparation system and a method for its operation.

Usually in the course of the rinsing program in a dishwasher, one or more cleansing processes are carried out, followed by a clear rinsing phase. In this case, the rinsing liquid used is contaminated on the one hand by the addition of active detergent substances, such as tensides for example and on the other hand by rinsing residue released from the items being rinsed. In order to achieve a satisfactory rinsing result at the end of the rinsing program, the rinsing liquid is renewed at least after the pre-rinsing run and after the main rinsing run. In this case, the used rinsing liquid together with the active detergent substances and rinsing residue contained therein is discarded as waste water. Furthermore, fresh water is supplied with every renewal of the rinsing solution in the course of the rinsing program and thus the water requirement of the dishwasher is increased.

It is the object of the present invention to provide a dishwasher which makes it possible to reduce the water requirement during the rinsing mode in order to minimise operating costs on the one hand and improve environmental compatibility on the other hand.

This and other objects of the present invention are solved by the dishwasher and method of the present invention.

The dishwasher according to the invention comprises a water preparation system provided with a water preparation container which can receive at least a part of the rinsing liquid used during the rinsing mode of the dishwasher, wherein in the water preparation container impurities contained in the rinsing liquid are at least partially biodegraded with the aid of micro-organisms during a water preparation phase.

In this way, at least part or even the entire rinsing liquid used during the rinsing program can be prepared and made ready for re-use in a following rinsing run. An advantage of the dishwasher according to the invention is thus that the fresh water requirement is reduced by preparing and re-using at least part of the used rinsing liquid. The environmental contamination is further reduced with the dishwasher according to the invention since at least some of the water used during the rinsing mode is not discarded unclarified as waste water but is re-processed or clarified still in the dishwasher. As a result of the biological preparation and recovery of the used rinsing liquid, the rinsing performance is maintained during subsequent rinsing processes of the dishwasher.

The rinsing liquid used in a dishwasher acquires a content of dissolved organic substances in the course of the rinsing process which substantially depends on the type and extent of the contamination of the items to be rinsed. The contaminant substances contained in the rinsing liquid can be degraded with the aid of specific micro-organisms, such as bacteria for example which are already found naturally in the water. In this case, the bacteria use the organic contents of the rinsing liquid as a nutrient base.

In a preferred embodiment of the present invention the water preparation system contains micro-organisms which are especially suited for the biological degradation of the organic contents in the rinsing liquid. On contact between the rinsing liquid and the micro-organisms, specific catalytic and biological degradation reactions take place, where both organic rinsing residue and tensides are degraded, which cleanses the rinsing liquid in the system. In order to achieve sufficient cleansing of the rinsing liquid by the biological degradation processes, experience shows that the rinsing liquid should remain for about 3.5 hours in the water preparation container, this residence time being dependent on a plurality of criteria such as the oxygen content, the type and degree of contamination of the rinsing liquid or the number and efficiency of the micro-organisms present in the water preparation container. Since a dishwasher in domestic use is usually operated at most once a day, a residence time of the rinsing liquid in the water preparation container of 3.5 hours is usually easy to achieve.

The biological degradation process of the organic contents in the water is crucially determined by the available biologically active surface with which the rinsing liquid comes in contact. In a further preferred embodiment of the present invention, the largest possible surfaces are provided in the water preparation container, on which the cultures of micro-organisms can settle and which are at least temporarily in contact with the rinsing liquid during the water preparation phase. It is especially advantageous if the water preparation container has biologically active surfaces which promote the growth of micro-organisms and their adhesion to the surface.

The vast majority of micro-organisms occur naturally in the form of biofilms. Biofilm formation begins when a cell settles on a surface and multiplies there. Various causes may be responsible for the adhesion of micro-organisms on a surface. Almost every surface provides adhesion potentials for micro-organisms. Some of the micro-organisms required for water purification can thus be settled on so-called growth bodies. In a preferred embodiment of the present invention, there is preferably provided in the water preparation container at least one growth body having a biologically active surface which promotes the growth of micro-organisms and their adhesion to the surface. The more growth bodies arranged in the water preparation container, the larger is the biologically active surface and therefore the cleaning effect caused by the biological degradation process.

A particular advantage of using growth bodies is the immobilisation of the bacteria adhering to the growth bodies which brings about little accumulation of sludge in the water preparation container and little flushing of micro-organisms out of the water preparation container with the rinsing liquid after the water preparation phase. The micro-organisms settle on the growth bodies and there form a biofilm consisting of a bacterial mixed culture. Such biofilms are formed especially if micro-organisms settle at interfaces between gas and liquid phases (e.g. at the free water level), liquid and solid phases (e.g. on the growth body in the water preparation system) or at liquid/liquid phases (e.g. on oil droplets at the water surface) and form a biofilm.

Biofilms of micro-organisms develop particularly well if the surface is covered with organic polymers. In a further preferred embodiment of the present invention, the growth bodies therefore consist of mechanically and biologically resistant material, made at least partly from plastic or ceramic such as, for example, expanded clay, lava, anthracite or basalt whose surface is covered with organic polymers.

In a further preferred embodiment of the present invention, the water preparation system according to the invention has a device for ventilating the rinsing liquid for supplying oxygen into the rinsing liquid. The oxygen content in the water is of crucial importance for the biological activity and the biological degradation of the organic contents in the rinsing liquid. The aerobic state achieved by the ventilating unit makes it possible to achieve so-called aerobic biological degradation of the organic contents. The intracellular, biochemical oxidation of the organic contents by bacteria continuously uses the oxygen dissolved in the rinsing liquid.

The ventilation of the rinsing liquid ensures the oxygen supply so that as far as possible a permanent oxygen excess is present in the rinsing liquid. The ventilation can, for example comprise an air pump which at least temporarily introduces air into the rinsing liquid contained in the water preparation container preferably in the lower area of the water preparation container. Additionally or alternatively, a spraying device can be provided in the water preparation container for supplying oxygen into the rinsing liquid, which spray device at least temporarily introduces rinsing liquid into the water preparation container preferably in the upper area of the water preparation container. The spraying device for example atomises the rinsing liquid by means of nozzles and thereby takes up oxygen from the air.

The rinsing liquid is appropriately introduced into the water preparation container via a water tank located after the circulating pump of the dishwasher in relation to the direction of flow of the rinsing liquid. The need for an additional pump can thereby be avoided and instead the pumping capacity of the circulating pump provided in the dishwasher in any case can be used to convey the rinsing liquid from the rinsing circuit of the dishwasher into the water preparation container. However, the rinsing liquid can also be introduced into the water preparation container by means of a separate pump which allows the rinsing liquid to be conveyed from the rinsing circuit of the dishwasher into the water preparation container independently of the operation of the circulating pump.

It is especially advantageous if the water preparation system according to the invention comprises a disinfection unit, e.g. a UV lamp or a device for adding oxygen, hydrogen peroxide or perborate which is located for example in the area of an outlet pipe from the water preparation container in order to inactivate the micro-organisms which are passed out from the water preparation container together with the rinsing liquid. It can thus be ensured that the micro-organisms active in the water preparation container which are flushed out with the rinsing liquid leaving the water preparation container become ineffective after they have been exposed to UV light.

The aforesaid objects are further solved by a method for operating a dishwasher with a water preparation system according to the present invention, which at least comprises the following steps:

Introducing at least some of the rinsing liquid used during the rinsing mode from the water circuit of the dishwasher into the water preparation container after or during a pre-rinsing run, a main rinsing run or clear rinsing run in a water preparation container;

Storing the rinsing liquid in the water preparation container during a water preparation phase, wherein the impurities contained in the rinsing liquid are at least partially biodegraded with the aid of micro-organisms; and passing the rinsing liquid out from the water preparation container into the water circuit of the dishwasher.

By using this method according to the present invention, some of the rinsing liquid or all of the rinsing liquid used during the rinsing program in the dishwasher is kept in the water preparation container, prepared there during a water preparation phase and made ready for re-use in a following rinsing run. The method according to the invention thus also provides the advantage that the fresh water requirement of the dishwasher is reduced by preparing and re-using at least some of the used rinsing solution. During the water preparation phase the organic substances dissolved in the rinsing liquid are degraded by means of specific micro-organisms, these micro-organisms using the organic contents of the rinsing liquid as a nutrient base. This further yields the advantage of little environmental contamination since at least some of the water used during the rinsing mode is not discarded unclarified as waste water but is re-prepared in the dishwasher and freed from organic contaminants.

Although the micro-organisms required for the water purification are generally already present in the water, in a preferred embodiment of the method according to the invention micro-organisms can be additionally supplied to the system before or during the water preparation phase, for example in the form of powders or tablets containing corresponding bacteria which are added to the cleaning tank of the dishwasher, these being added directly to the cleaning agent for example or added directly into the water preparation container.

In order to promote the biological degradation processes required for purifying the contaminants in the rinsing liquid, the method according to the present invention can be preceded by an additional step where at least some of the micro-organisms required for the water purification are settled on at least one growth body preferably in the form of a biofilm. It is also possible for the growth body to be removed from the system for this purpose, wetted with a solution containing the corresponding bacteria and inserted back into the system.

In dishwashers, the last rinsing process is generally followed by a clear rinsing phase where the rinsing liquid is mixed with a clear rinsing agent. The rinsing liquid used during the clear rinsing phase usually has a much lower degree of contamination than the rinsing solution used during the main rinsing phase. In a preferred embodiment of the method according to the invention therefore at least or exclusively the rinsing liquid used during the clear rinsing phase is fed into the water preparation container for water preparation during or after the clear rinsing phase. In this way, at least the rinsing liquid used during the clear rinsing phase is prepared and stored for a following rinsing process. The same applies to the intermediate rinsing phase. It is especially advantageous if the rinsing liquid passed out from the water preparation container after the water preparation phase is used for a following pre-rinsing run since no particularly high requirements on the clarity of the rinsing liquid need to be imposed during the pre-rinsing run.

In a further preferred embodiment of the method according to the present invention, the rinsing liquid in the water preparation container is at least temporarily circulated preferably by means of a separate circulating pump during the water preparation phase. For this purpose a water circulation system can also be provided which passes the rinsing liquid from the lower area of the water preparation container into the upper area of the water preparation container and preferably introduces it back into the water preparation container by means of a spraying device. As a result, the rinsing liquid in the water preparation container is intensively mixed with air, the oxygen content is increased and as a result of the continuous flowing movement said rinsing liquid is continuously passed over the biologically active surfaces of the water preparation container and the growth body.

In order not to impair the efficiency of the biologically active surfaces, a further process step can be carried out before introducing the rinsing liquid into the water preparation container, wherein the rinsing liquid is filtered to remove coarse rinsing residue.

In a further preferred embodiment of the invention, after the water preparation phase, the rinsing liquid is exposed to a disinfection unit, e.g using UV light, ozone, hydrogen peroxide or perborate in order to inactivate the micro-organisms passed out of the water preparation container with the rinsing liquid.

The present invention is explained in detail hereinafter using preferred exemplary embodiments with reference to the appended drawings. In the figures:

FIG. 2 is a sectional view according to a second embodiment of the present invention.

Figure 1:
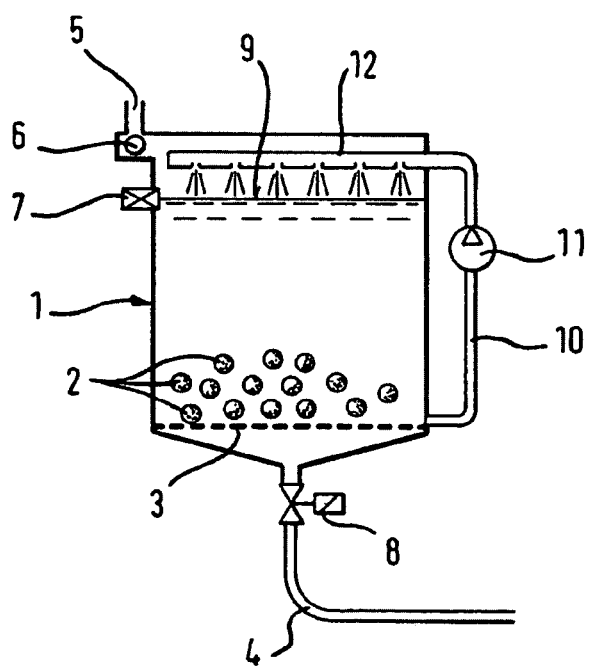
FIG. 1 is a sectional view according to a first embodiment of the present invention.

FIG. 1 is a sectional view of a water preparation system in a first embodiment as can be used in a dishwasher according to the present invention. The system comprises a water preparation container 1 which can be filled with rinsing liquid via an inlet or outlet pipe 4 which can be closed by an inlet or outlet valve 8. In this case, used rinsing liquid from the water cycle of the dishwasher (not shown) is supplied to the water preparation container 1 up to a maximum liquid level 9 which is determined by a level recognition sensor 7. In its upper area the water preparation container 1 also has a ventilation opening 5 to facilitate the escape of air from the water preparation container 1 on the one hand during filling of the water preparation container 1 with rinsing liquid and on the other hand, to ensure that oxygen is supplied from the surroundings into the interior of the water preparation container 1 during the water preparation phase. The ventilation opening 5 is fitted with an overflow protection valve 6 to prevent any overflow during filling of the water preparation container 1. The overflow protection valve 6 is constructed in the form of a ball which floats on the rinsing liquid and closes the ventilation opening 5 if the water preparation container 1 is overfilled.

A water tank (not shown) located behind the circulating pump of the dishwasher can be provided to fill the water preparation container 1 with rinsing liquid. If rinsing liquid is to be removed from the rinsing circuit of the dishwasher and supplied to the water preparation container 1, the water tank is adjusted so that the rinsing liquid is fed into the water preparation container 1 via the inlet or outlet pipe 4. The need for an additional pump can thereby be avoided and instead, the pumping capacity of the circulating pump which is provided in the dishwasher in any case can be used to convey the rinsing liquid from the rinsing circuit of the dishwasher into the water preparation container 1. However, the rinsing liquid can also be fed into the water preparation container 1 via a separate pump (not shown) which makes it possible to convey the rinsing liquid from the rinsing circuit of the dishwasher into the water preparation container 1 independently of the operation of the circulating pump.

The water preparation container 1 has biologically active surfaces on its inside which promote the growth of micro-organisms and their adhesion in order to support the biodegradation process of the inorganic contents in the rinsing liquid during the water preparation phase. In addition, the water preparation container 1 contains a number of spherical growth bodies 2 which are loosely mounted on a growth grid 3 in the lower area of the water preparation container 1. The growth bodies 2 also have a biologically active surface which promotes the growth of micro-organisms and their adhesion to the surface.

During the water preparation phase the rinsing liquid can be at least temporarily circulated by means of a separate circulating pump 11 in the water preparation container 1. For this purpose a water circulation system is provided which passes the rinsing liquid from the lower area of the water preparation container 1 via a circulating pipe 10 back into the upper area of the water preparation container 1. As a result of the continuous flow movement, the rinsing liquid is passed over the biologically active surfaces of the water preparation container 1 and the growth body 2, favouring the biological degradation processes.

As has been described above, the oxygen content in the rinsing liquid is of crucial importance for the efficacy of the biological degradation processes. The embodiment of the water preparation system according to the invention shown in FIG. 1 thus has a device for ventilating the rinsing liquid to supply oxygen into the rinsing liquid. In this case, the rinsing liquid is passed into the water preparation container 1 from the circulating pipe 10 via a spraying device 12 arranged in the upper area of the water preparation container 1. The spray device 12 comprises nozzles which atomise the rinsing liquid as it passes into the water preparation container 1 so that the rinsing liquid can take up oxygen from the air. After the water preparation phase, the re-prepared rinsing liquid is passed from the water preparation container 1 back into the water circuit of the dishwasher by opening the inlet or outlet valve 8 via the inlet or outlet pipe 4.

FIG. 2 shows a sectional view of a water preparation system in a second embodiment such as can be used in a dishwasher according to the present invention. The system shown in FIG. 2 is partly identical to the first embodiment shown in FIG. 1 so that reference can be made to the previous description of the first embodiment and only the differences are explained subsequently. Components of the second embodiment shown in FIG. 2 which are identical to components of the first embodiment shown in FIG. 1 were indicated by the same reference numbers.

Additionally provided in the embodiment shown in FIG. 2 in addition to the spherical growth bodies 2 are rod- or disk-shaped growth bodies 13, each having a biologically active surface which favours the growth of micro-organisms and their adhesion to the surface. Alternatively or additionally to the water circulation system comprising the circulating pipe 10 and the separate circulating pump 11 for circulating the rinsing liquid in the water preparation container 1 in the first embodiment, an air pump 15 for ventilating the rinsing liquid is provided in the second embodiment. In the lower part the air pump 15 is located outside the water preparation container 1 and at least temporarily introduces air from the surroundings into the rinsing liquid contained in the water preparation container 1 in order to increase the oxygen content in the rinsing liquid and thereby obtain an aerobic state.

In the second embodiment the water preparation system according to the invention has a disinfection unit, e.g. a UV lamp 14 or devices for adding ozone, hydrogen peroxide or perborate which, for example, is located in the area of an inlet or outlet pipe 4 from the water preparation container 1 in order to inactivate the micro-organisms passed out from the water preparation container 1 with the rinsing liquid. It is thereby achieved that the active micro-organisms in the water preparation container 1 which are flushed out with the rinsing liquid when it leaves the water preparation container 1 are inactive after they have been exposed to UV light, ozone, hydrogen peroxide or perborates.

| Reference list | |
|---|---|
| 1 | Water preparation container |
| 2 | Spherical growth body |
| 3 | Growth grid for the growth bodies |
| 4 | Supply and outlet pipe of the water preparation container |
| 5 | Ventilation opening of the water preparation container |
| 6 | Overflow protection valve |
| 7 | Level recognition sensor |
| 8 | Inlet or outlet valve |
| 9 | Rinsing liquid level |
| 10 | Circulating pipe |
| 11 | Separate circulating pump |
| 12 | Spraying device |
| 13 | Rod- or disk-shaped growth body |
| 14 | Disinfection unit |
| 15 | Air pump |

The invention claimed is:

1. A dishwasher having a rinsing liquid circulating means for circulating a rinsing liquid into contact with items to be washed, the dishwasher comprising:
   a receptacle for items to be washed; and
   a water preparation system including:
      a water preparation container for receiving at least a part of a to-be-re-circulated rinsing liquid that has already been circulated into contact with items to be washed in the receptacle and that will be circulated again into contact with items to be washed, the to-be-recirculated rinsing liquid having organic contents and the water preparation container having a device for biologically degrading the organic contents of the to-be-re-circulated rinsing liquid, the device for biologically degrading the organic contents of the to-be-re-circulated rinsing liquid being configured for retaining micro-organisms suitable for biologically degrading the organic contents of the to-be-re-circulated rinsing liquid,
      at least one growth body that is a separate body from the water preparation container and located in the water preparation container, the growth body having a biologically active surface for promoting at least one of the growth of micro-organisms suitable for biologically degrading the organic contents of the to-be-re-circulated rinsing liquid and the adhesion of such micro-organisms to the biologically active surface, and
      a biofilm of the micro-organisms on the growth body.

2. The dishwasher according to claim 1, wherein the at least one growth body is a mechanically and biologically resistant material made at least partly from plastic or made at least partly from ceramic formed of at least one of a group of material that is expanded clay, lava, anthracite or basalt, and its surface is covered with organic polymers.

3. The dishwasher according to claim 1, wherein the water preparation container has biologically active surfaces which promote the growth of the micro-organisms and their adhesion to the biologically active surfaces of the water preparation container and which are at least temporarily in contact with the rinsing liquid during the water preparation phase.

4. The dishwasher according to claim 1, wherein the water preparation system has a device for ventilating the rinsing liquid for supplying oxygen into the rinsing liquid.

5. The dishwasher according to claim 4, wherein the device for ventilating the rinsing liquid comprises an air pump which at least temporarily introduces air into the rinsing liquid contained in the water preparation container in a lower area of the water preparation container, the air pump operating to draw in air from surroundings and to introduce the drawn in air into the rinsing liquid.

6. The dishwasher according to claim 4, wherein the device for ventilating the rinsing liquid for supplying oxygen into the rinsing liquid comprises a spraying device which at least temporarily introduces rinsing liquid into the water preparation container preferably in an upper area of the water preparation container.

7. The dishwasher according to claim 1, wherein the rinsing liquid is introduced into the water preparation container via a water tank arranged after a circulating pump of the dishwasher with reference to a flow direction of the rinsing liquid.

8. The dishwasher according to claim 1, wherein the rinsing liquid is fed into the water preparation container by means of a separate pump.

9. The dishwasher according to claim 1, wherein the water preparation system has a disinfection unit that is a selected one of a UV lamp, a device for supplying ozone, hydrogen peroxide or perborate, or another device that is not a UV lamp or a device for supplying ozone, hydrogen peroxide or perborate, and the disinfection unit is located in order to inactivate the micro-organisms passed out from the water preparation container with the rinsing liquid.

10. The dishwasher according to claim 1, wherein the growth body is loosely positioned in the water preparation container such that the growth body can move relative to the water preparation container.

11. The dishwasher according to claim 1, wherein the at least one growth body is a plurality of growth bodies, the growth bodies are loosely positioned in the water preparation container such that the growth bodies can move relative to the water preparation container, and the growth bodies are positioned on a supportive grid.

12. A method for operating a dishwasher with a water preparation system, the method comprising the steps of:
   introducing at least some of a rinsing liquid used during a rinsing mode from a water circuit of the dishwasher into a water preparation container after or during a pre-rinsing run, a main rinsing run or clear rinsing run;
   setting micro-organisms in the form of a biofilm on at least one growth body, the at least one growth body being a separate body from the water preparation container and located in the water preparation container;
   storing the rinsing liquid in the water preparation container during a water preparation phase, wherein impurities contained in the rinsing liquid are at least partially biodegraded with the aid of the micro-organisms; and
   passing the rinsing liquid out from the water preparation container into the water circuit of the dishwasher, wherein the rinsing liquid passed out from the water preparation container after the water preparation phase is used for a following pre-rinsing run.

13. The method according to claim 12, and further comprising supplying the micro-organisms required for the water purification before or during the water preparation phase.

14. The method according to claim 12, and further comprising feeding one of at least the rinsing liquid and only the rinsing liquid used during the clear rinsing run into the water preparation container for water preparation during or after the clear rinsing run.

15. The method according to claim 12, and further comprising temporarily circulating the rinsing liquid in the water preparation container during the water preparation phase using a separate circulating pump.

16. The method according to claim 12, and further comprising temporarily ventilating the rinsing liquid in the water preparation container during the water preparation phase.

17. The method according to claim 16, wherein the temporary ventilating of the rinsing liquid in the water preparation container during the water preparation phase is by means of an air pump.

18. The method according to claim 12, and further comprising filtering the rinsing liquid from coarse rinsing residue before the rinsing liquid is introduced into the water preparation container.

19. The method according to claim 12, and further comprising exposing the rinsing liquid after the water preparation phase to a disinfection unit to thereby expose the rinsing liquid to at least one of UV light, ozone, hydrogen peroxide, perborate, and another agent that inactivates micro-organisms to thereby inactivate the micro-organisms passed out from the water preparation container with the rinsing liquid.

20. The method according to claim 12, further comprising loosely positioning the growth body in the water preparation container such that the growth body can move relative to the water preparation container.

* * * * *

UNITED STATES PATENT AND TRADEMARK OFFICE
CERTIFICATE OF CORRECTION

PATENT NO. : 8,496,759 B2  Page 1 of 1
APPLICATION NO. : 10/572146
DATED : July 30, 2013
INVENTOR(S) : Heiligenmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 970 days.

Signed and Sealed this

Fifteenth Day of September, 2015

Michelle K. Lee
*Director of the United States Patent and Trademark Office*